United States Patent
Lee et al.

(10) Patent No.: US 7,665,877 B2
(45) Date of Patent: Feb. 23, 2010

(54) PRISM SHEET, BACKLIGHT UNIT USING THE SAME, AND METHOD FOR FABRICATING THE PRISM SHEET

(75) Inventors: Man Hoan Lee, Kyongsangbuk-do (KR); Ji Su Yoon, Seoul (KR); Sung Keun Lee, Kyungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/313,783

(22) Filed: Dec. 22, 2005

(65) Prior Publication Data
US 2007/0002583 A1 Jan. 4, 2007

(30) Foreign Application Priority Data
Jun. 29, 2005 (KR) .................. 10-2005-0056972

(51) Int. Cl.
*F21V 8/00* (2006.01)
(52) U.S. Cl. .................. 362/608; 362/620; 362/615
(58) Field of Classification Search .............. 362/620, 362/615, 608, 331, 332; 359/625
See application file for complete search history.

(56) References Cited

U.S. PATENT DOCUMENTS 4,924,356 A * 5/1990 French et al. .............. 362/607
5,521,725 A * 5/1996 Beeson et al. .............. 349/95
6,606,135 B2 * 8/2003 Nakanishi et al. .......... 349/95
7,484,874 B2 * 2/2009 Lee et al. ................... 362/607

FOREIGN PATENT DOCUMENTS

| JP | 11-084109 A | 3/1999 |
| JP | 11-84536 A | 3/1999 |
| JP | 11-271673 A | 10/1999 |
| JP | 2000-47008 A | 2/2000 |
| JP | 2000-171617 A | 6/2000 |
| JP | 2000-284268 A | 10/2000 |
| JP | 2002-107717 A | 4/2002 |
| JP | 2002-182008 A | 6/2002 |
| JP | 2002-350607 A | 12/2002 |
| JP | 2004-361750 A | 12/2004 |
| JP | 2005-148440 A | 6/2005 |

\* cited by examiner

*Primary Examiner*—Sharon E Payne
(74) *Attorney, Agent, or Firm*—Birch, Stewart, Kolasch & Birch, LLP

(57) ABSTRACT

A prism sheet capable of enhancing light efficiency and viewing angle characteristics, a backlight unit using the prism sheet, and a method for fabricating the prism sheet are disclosed. The prism sheet includes a transparent substrate, a plurality of grooves formed in an upper surface of the transparent substrate to extend in a parallel direction with each other and to be uniformly spaced apart from one another by a predetermined distance, a plurality of reflection patterns respectively formed in the grooves, and a plurality of lenticular lenses formed on the upper surface of the transparent substrate formed with the reflection patterns.

22 Claims, 10 Drawing Sheets

PRISM SHEET, BACKLIGHT UNIT USING THE SAME, AND METHOD FOR FABRICATING THE PRISM SHEET

This application claims the benefit of the Korean Patent Application No. 10-2005-0056972, filed on Jun. 29, 2005 which is hereby incorporated by reference as if fully set forth herein.

BACKGROUND OF THE INVENTION

1. Field of the Invention

The present invention relates to a back light unit, and more particularly, to a prism sheet capable of enhancing light efficiency and viewing angle characteristics, a backlight unit using the prism sheet, and a method for fabricating the prism sheet.

2. Discussion of the Related Art

Recently, various flat panel display devices have been developed that eliminates bulky and heavy structural nature disadvantages of cathode ray tubes (CRTs). One such flat panel display devices is a liquid crystal display (LCD). The LCD displays a desired image by adjusting a transmission amount of light beams irradiated from a backlight unit using a liquid crystal panel including a plurality of liquid crystal cells and a plurality of control switches adapted to switch video signals to be supplied to the liquid crystal cells, respectively.

FIG. 1 is a schematic view illustrating a related art backlight unit.

As illustrated in FIG. 1, the related art backlight unit includes a lamp 10 which emits light, a light guide plate 20 which guides the light incident thereto from the lamp 10, a lamp housing 12 which encloses an incidence face 22 of the light guide plate 20 and the lamp 10, a reflection plate 30 which is arranged beneath the light guide plate 20, a diffusion sheet 40 which is arranged on the light guide plate 20 to diffuse light emerging from the light guide plate 20, and a prism sheet 50 which adjusts the traveling direction of light emerging from the diffusion sheet 40.

For the lamp 10, a cold cathode fluorescent lamp is mainly used. The lamp 10 is turned on by a lamp drive voltage supplied from an inverter (not shown), to irradiate light to be incident to the incidence face 22 of the light guide plate 20 formed at one side of the light guide plate 20.

The lamp housing 12 is arranged at the incidence face side of the light guide plate 20 to enclose the lamp 10 and the incidence face 22 of the light guide plate 20. The lamp housing 12 is provided, at an inner surface thereof, with a reflection face to reflect the light from the lamp 10 toward the incidence face 22 of the light guide plate 20.

The light guide plate 20 enables the incident light from the lamp 10 to reach a position spaced apart from the lamp 10 by a great distance, and guides the incident light toward the diffusion sheet 40. A printed pattern is provided at an inclined lower surface of the light guide plate 20 to form an inclined reflection face, so that the light incident to the incidence face 22 is reflected from the inclined reflection face of the light guide plate 20 at a certain angle such that the light travels uniformly toward the diffusion sheet 40.

The reflection plate 30 is arranged beneath the light guide plate 20 to re-reflect any light incident to thereto from the reflection face of the light guide plate 20 toward the light guide plate 20 to reduce a loss of light.

The diffusion sheet 40 diffuses the light emerging from the light guide plate 20 to the entire region of the prism sheet 50.

The prism sheet 50 condenses the light emerging from the diffusion sheet 40. To this end, the prism sheet 50 includes a condensing film 52 made of polyester (PET), and prism peaks/crests 54 formed on an upper surface of the condensing film 52 in the form of stripes, as shown in FIG. 2.

Each prism crest 54 has first and second inclined faces each having a certain inclination from the apex of the prism crest 54. For example, each of the first and second inclined face is inclined by about 45° from the upper surface of the condensing film 52.

When it is assumed that the condensing film 52 of the prism sheet 50 has a refractive index n1, and the outside of the prism sheet 50 has a refractive index n2, light incident to the condensing lens 52 at an angle θ1 is refracted at an angle θ2 at the prism peaks 54 in accordance with Snell's Law, as expressed by the following equation 1, and is then emitted to the outside of the prism sheet 50.

$$\frac{n1}{n2} = \frac{\sin\theta 1}{\sin\theta 2} \qquad \text{equation 1}$$

In the above-mentioned related art backlight unit, light emitted from the lamp 10 is advanced toward the diffusion sheet 40 arranged above the light guide plate 20 via the light guide plate 20. The light emitted from the light guide plate 20 is diffused by the diffusion sheet 40 over the entire region of the prism sheet 50. The diffused light is then condensed as it passes through the prism sheet 50, and is then externally emitted.

In the above-mentioned related art backlight unit, the light incident to the prism sheet 50 may be divided into those of three regions, namely, a full reflection region, a condensing region, and a side lobe region, as shown in FIG. 3.

In detail, the light of the full reflection region, namely, light (A) vertically incident to the condensing film 52, is reflected by the first and second inclined faces of the prism peaks 54, so that the light (A) is directed back to the light guide plate 20. Thus, the light (A) is recycled to be condensed.

The light of the condensing region, namely, light B incident to the condensing film 52 at a particular angle, is refracted by the first or the second inclined face of the prism peaks 54, so that the light (B) is condensed and emitted as useful light.

On the other hand, the light of the side lobe region, namely, light (C) incident to the condensing film 52 at another particular angle, is reflected by the first or the second inclined face of the prism peaks 54, so that the light (C) escapes and thus causes degradation in light efficiency and in viewing angle characteristics.

For this reason, there are bright regions in the prism sheet 50 at opposite sides of a symmetrical line of the prism sheet 50, as shown in FIG. 4. Thus, the related art backlight unit has problems caused by the structure of the prism sheet 50, namely, a viewing angle asymmetry caused by brightness asymmetry and a degradation in light efficiency caused by side lobes.

In order to solve the problems incurred in the related art prism sheet, a lenticular lens sheet to be used as a condensing sheet has been proposed. Such a lenticular lens sheet is disclosed in U.S. Pat. No. 5,870,224 issued to Saitoh et al. on Feb. 9, 1999 and is shown in FIG. 5.

Referring to FIG. 5, the related art lenticular lens sheet includes a plurality of lenticular lenses 21 formed on an upper surface of a transparent substrate 1, a reflection pattern 23 formed on a lower surface of the transparent substrate 1, a condensing layer 14 formed on the lower surface to cover the reflection pattern 23, and a transparent resin layer 16 formed on the condensing layer 14. The related art lenticular lens sheet attempts to prevent the loss of light caused by the side lobes in the structure of FIG. 4 using the reflection pattern 23 and lenticular lenses 21.

The reflection pattern 23 of the related art lenticular lens sheet may be formed using the following method. First, an adhesive layer (not shown) is coated over the lower surface of the transparent substrate 1. Parallel light is then irradiated to the transparent substrate 1 from above the lenticular lenses 21 and is condensed at the adhesive layer by the lenticular lenses 21. The adhesive layer loses adhesion properties in regions where the light is irradiated and retains adhesion properties in regions where no light is irradiated. A reflection pattern is transferred to the adhesion layer to form the reflection pattern on portions of the transparent substrate 1 corresponding to respective valleys of the lenticular lenses 21.

The reflection pattern 23 functions to shield and reflect light that would cause a degraded condensation. The light reflected by the reflection pattern 23 is re-reflected by a reflection plate arranged beneath the reflection pattern 23, so that the reflected light is recycled.

However, the above-mentioned related art lenticular lens sheet has a problem in that the reflection pattern 23 bonded to the adhesive layer may deform due to heat or external pressure or may peel off due to a degradation in the adhesion force of the adhesive layer. Furthermore, the related art lenticular lens sheet has a problem in that it is impossible to form the reflection pattern 23 with diverse shapes because the reflection pattern 23 is bonded to the lower surface of the transparent substrate 1 using the parallel light.

SUMMARY OF THE INVENTION

Accordingly, aspects of the present invention are directed to a prism sheet, a backlight unit using the same, and a method for fabricating the prism sheet that substantially obviate one or more problems due to limitations and disadvantages of the related art.

An object of the present invention is to provide a prism sheet capable of enhancing light efficiency and viewing angle characteristics, a backlight unit using the prism sheet, and a method for fabricating the prism sheet.

Another object of the present invention is to provide a prism sheet capable of enhancing light efficiency and viewing angle characteristics using a reflection pattern that can have diverse shapes, a backlight unit using the prism sheet, and a method for fabricating the prism sheet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structures and methods particularly pointed out in the written description and claims hereof as well as in the appended drawings.

To achieve these objects and other advantages and in accordance with the purpose of the invention, as embodied and broadly described herein, a prism sheet according to an embodiment of the present invention comprises: a transparent substrate; a plurality of grooves formed in an upper surface of the transparent substrate to extend in a parallel direction to each other and to be uniformly spaced apart from one another; a plurality of reflection patterns respectively formed in the plurality of grooves; and a plurality of lenticular lenses formed on the upper surface of the transparent substrate formed with the plurality of reflection patterns.

In another embodiment of the present invention, a prism sheet comprises: a transparent substrate; a plurality of lenticular lenses formed on the transparent substrate; and a plurality of reflection patterns formed in respective valleys of the plurality of lenticular lenses.

In another embodiment of the present invention, a prism sheet comprises: a transparent substrate; a plurality of lenticular lenses formed on an upper surface of the transparent substrate; and a structure formed on a lower surface of the transparent substrate to face valleys of the plurality of lenticular lenses.

The structure may comprise any combination of one or more curved grooves, one or more curved protrusions, and one or more triangular protrusions.

In another embodiment of the present invention, a prism sheet comprises: a transparent substrate; a plurality of lenticular lenses formed on the transparent substrate; a first protection layer formed on the transparent substrate to cover the plurality of lenticular lenses; a second protection layer formed over the first protection layer; a plurality of grooves formed in an upper surface of the second protection layer to extend in a parallel direction to each other and to be uniformly spaced apart from one another; and a plurality of reflection patterns respectively formed in the plurality of grooves.

In an embodiment of the present invention, a backlight unit comprises: at least one lamp which emits light; a light guide plate which changes a traveling direction of light, incident from the lamp through an incidence face provided at a side of the light guide plate corresponding to the lamp, to a direction perpendicular to an incident direction of the light; and a prism sheet which condenses the light emerging from the light guide plate, wherein the prism sheet comprises: a transparent substrate; a plurality of grooves formed in an upper surface of the transparent substrate to extend in a parallel direction to each other and to be uniformly spaced apart from one another; a plurality of reflection patterns respectively formed in the plurality of grooves; and a plurality of lenticular lenses formed on the upper surface of the transparent substrate formed with the plurality of reflection patterns.

In another embodiment of the present invention, a backlight unit comprises: at least one lamp which emits light; a light guide plate which changes a traveling direction of light, incident from the lamp through an incidence face provided at a side of the light guide plate corresponding to the lamp, to a direction perpendicular to an incident direction of the light; and a prism sheet which condenses the light emerging from the light guide plate, wherein the prism sheet comprises: a transparent substrate; a plurality of lenticular lenses formed on the transparent substrate; and a plurality of reflection patterns formed in respective valleys of the plurality of lenticular lenses.

In another embodiment of the present invention, a backlight unit comprises: at least one lamp which emits light; a light guide plate which changes a traveling direction of light, incident from the lamp through an incidence face provided at a side of the light guide plate corresponding to the lamp, to a direction perpendicular to an incident direction of the light; and a prism sheet which condenses the light emerging from the light guide plate, wherein the prism sheet comprises: a transparent substrate; a plurality of lenticular lenses formed on an upper surface of the transparent substrate; and a structure formed on a lower surface of the transparent substrate to face valleys of the plurality of lenticular lenses.

The structure may comprise any combination of one or more curved grooves, one or more curved protrusions, and one ore more triangular protrusions.

In another embodiment of the present invention, a backlight unit comprises: at least one lamp which emits light; a light guide plate which changes a traveling direction of light, incident from the lamp through an incidence face provided at a side of the light guide plate corresponding to the lamp, to a direction perpendicular to an incident direction of the light; and a prism sheet which condenses the light emerging from the light guide plate, wherein the prism sheet comprises: a transparent substrate; a plurality of lenticular lenses formed on the transparent substrate; a first protection layer formed on the transparent substrate to cover the plurality of lenticular lenses; a second protection layer formed over the first protection layer; a plurality of grooves formed in an upper surface of the second protection layer to extend in a parallel direction to each other and to be uniformly spaced apart from one another; and a plurality of reflection patterns respectively formed in the plurality of grooves.

In another embodiment of the present invention, a backlight unit comprises: a plurality of lamps which emit light; a bottom cover which receives and supports the plurality of lamps; a diffusion plate which covers an upper surface of the bottom cover, and diffuses the light emitted from the lamps; and a prism sheet which condenses light emerging from the diffusion plate, wherein the prism sheet comprises: a transparent substrate; a plurality of grooves formed in an upper surface of the transparent substrate to extend in a parallel direction to each other and to be uniformly spaced apart from one another; a plurality of reflection patterns respectively formed in the plurality of grooves; and a plurality of lenticular lenses formed on the upper surface of the transparent substrate formed with the plurality of reflection patterns.

In another embodiment of the present invention, a backlight unit comprises: a plurality of lamps which emit light; a bottom cover which receives and supports the plurality of lamps; a diffusion plate which covers an upper surface of the bottom cover, and diffuses the light emitted from the lamps; and a prism sheet which condenses light emerging from the diffusion plate, wherein the prism sheet comprises: a transparent substrate; a plurality of lenticular lenses formed on the transparent substrate; and a plurality of reflection patterns formed in respective valleys of the plurality of lenticular lenses.

In another embodiment of the present invention, a backlight unit comprises: a plurality of lamps which emit light; a bottom cover which receives and supports the plurality of lamps; a diffusion plate which covers an upper surface of the bottom cover, and diffuses the light emitted from the lamps; and a prism sheet which condenses light emerging from the diffusion plate, wherein the prism sheet comprises: a transparent substrate; a plurality of lenticular lenses formed on an upper surface of the transparent substrate; and a structure formed on a lower surface of the transparent substrate to face valleys of the plurality of lenticular lenses.

In another embodiment of the present invention, a backlight unit comprises: a plurality of lamps which emit light; a bottom cover which receives and supports the plurality of lamps; a diffusion plate which covers an upper surface of the bottom cover, and diffuses the light emitted from the lamps; and a prism sheet which condenses light emerging from the diffusion plate, wherein the prism sheet comprises: a transparent substrate; a plurality of lenticular lenses formed on the transparent substrate; a first protection layer formed on the transparent substrate to cover the plurality of lenticular lenses; a second protection layer formed over the first protection layer; a plurality of grooves formed in an upper surface of the second protection layer to extend in a parallel direction with each other and to be uniformly spaced apart from one another; and a plurality of reflection patterns respectively formed in the plurality of grooves.

In one embodiment of the present invention, a method for fabricating a prism sheet comprises the steps of: forming a plurality of grooves on an upper surface of a transparent substrate such that the grooves extend in a parallel direction to each other and uniformly spaced apart from one another; forming a plurality of reflection patterns in the plurality of grooves, respectively; and forming a plurality of lenticular lenses on the upper surface of the transparent substrate formed with the plurality of reflection patterns.

In another embodiment of the present invention, a method for fabricating a prism sheet comprises the steps of: forming a plurality of lenticular lenses on a transparent substrate; and forming a plurality of reflection patterns in respective valleys of the plurality of lenticular lenses.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the various principles of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
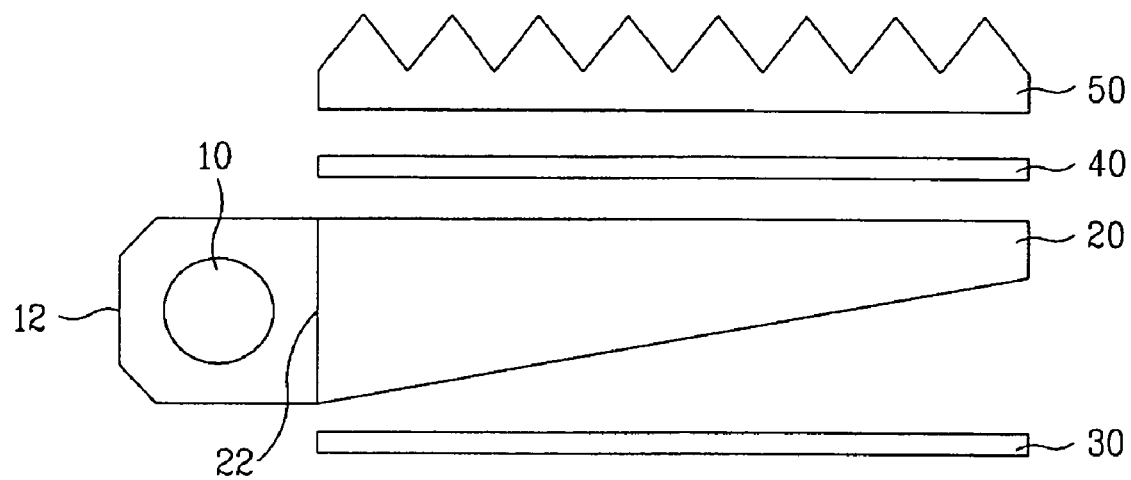
FIG. 1 is a schematic view illustrating a related art backlight unit.
Figure 2:
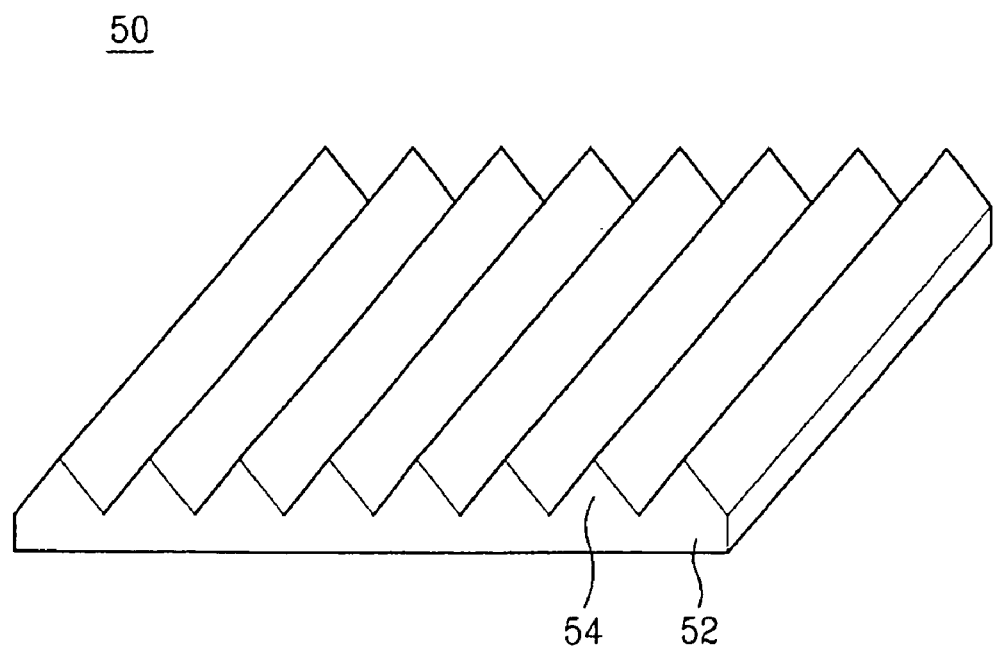
FIG. 2 is a perspective view illustrating the related art prism sheet shown in FIG. 1.
Figure 3:
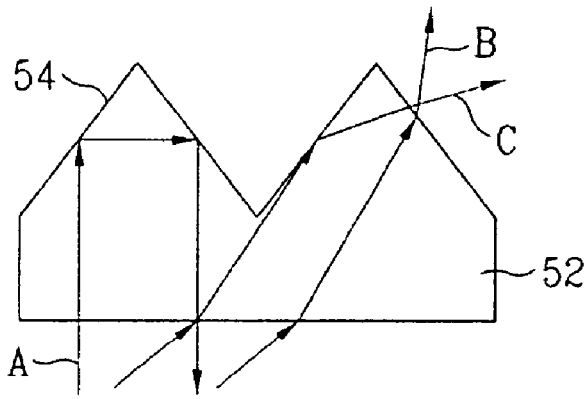
FIG. 3 is a schematic view illustrating optical characteristics of crests of the related art prism shown in FIG. 2.
Figure 4:
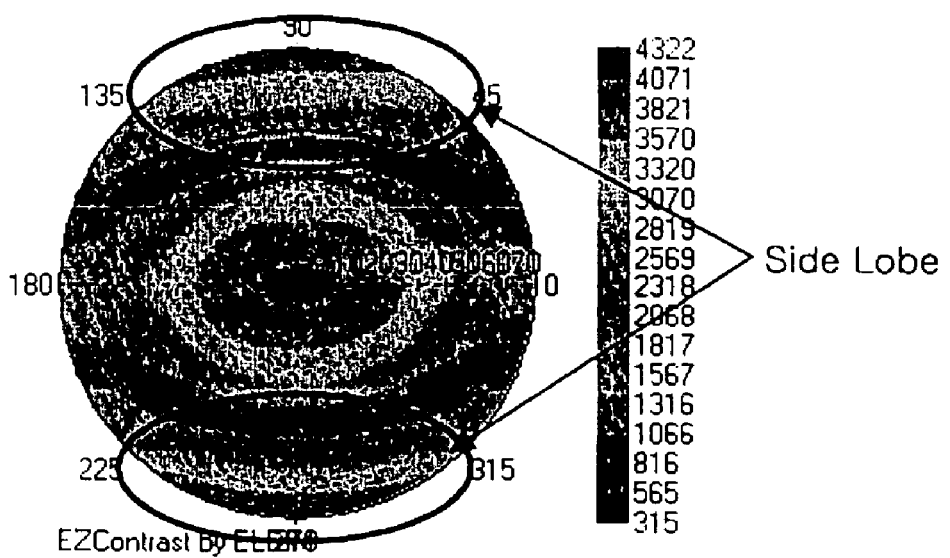
FIG. 4 is a diagram illustrating light transmission and light distribution in the related art prism sheet shown in FIG. 2.
Figure 5:
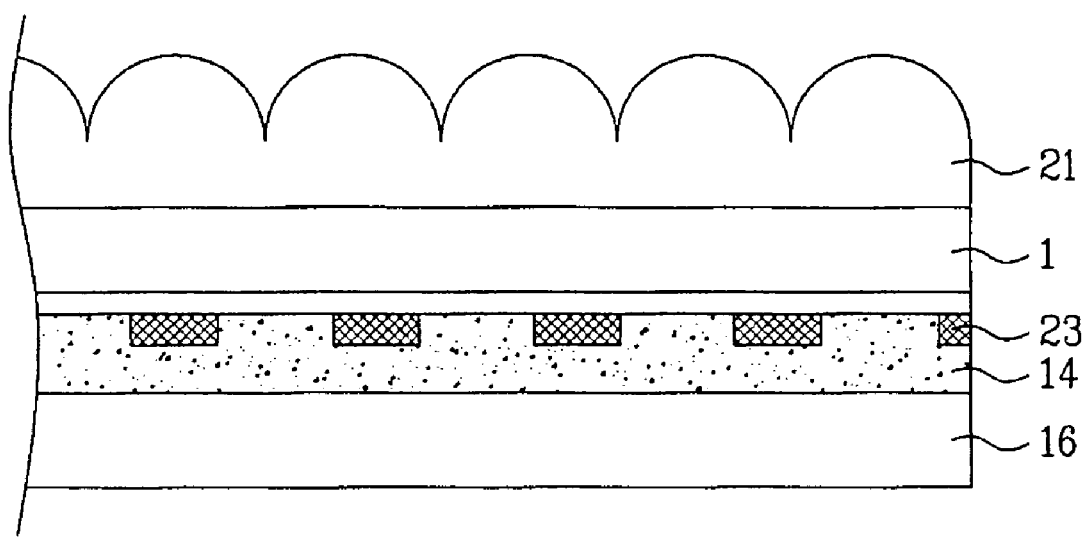
FIG. 5 is a sectional view illustrating a related art lenticular lens sheet.
Figure 6:
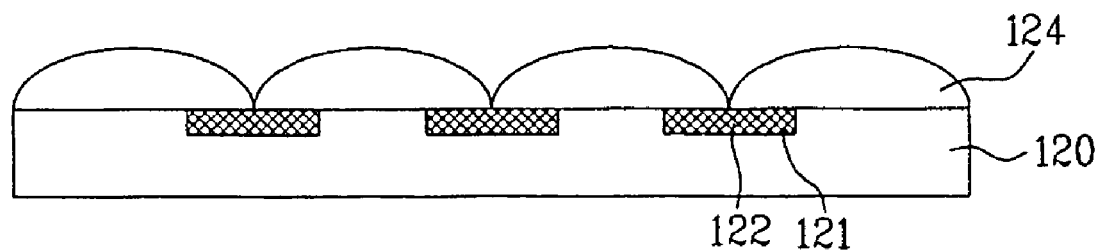
FIG. 6 is a sectional view illustrating a prism sheet according to a first embodiment of the present invention.

FIG. 6 is a sectional view illustrating a prism sheet according to a first embodiment of the present invention.

Referring to FIG. 6, the prism sheet according to the first embodiment of the present invention includes a transparent substrate 120, a plurality of grooves 121 formed in an upper surface of the transparent substrate 120 to extend in a parallel direction to each other and uniformly spaced apart from one another, a plurality of reflection patterns 122 respectively formed in the plurality of grooves 121, a plurality of lenticular lenses 124 formed on the upper surface of the transparent substrate 120 such that each lenticular lens 124 has a valley arranged on an associated one of the plurality of reflection patterns 122. The grooves may be viewed as indentations formed in the transparent substrate 120.

The transparent substrate 120 is fabricated to have a flat panel structure having a predetermined refractive index.

The grooves 121 are formed in the form of uniformly-spaced parallel stripes in the upper surface of the transparent substrate 120. Each groove 121 has a rectangular cross-section.

Each reflection pattern 122 is formed in an associated one of the grooves 121 to shield light incident to the transparent substrate 120 from a lower surface of the transparent substrate 120 in a state of being inclined at a certain angle or to reflect the incident light to the lower surface of the transparent substrate 120. The reflection patterns 122 are made of titanium oxide ($TiO_2$) or magnesium oxide (MgO).

The reflection patterns 122 reflect the light that otherwise would advance to side lobe regions after being incident to the transparent substrate 120 from the lower surface of the transparent substrate 120, toward the lower surface of the transparent substrate 120, thereby preventing or minimizing a loss of light. This helps to enhance the lighting and view angle characteristics.

The lenticular lenses 124 can be formed as parallel stripes on the upper surface of the transparent substrate 120, using a material such as polyester (PET). The valley of each lenticular lens 124 is arranged on an associated one of the reflection patterns 122 formed on the transparent substrate 120. In other words, an edge portion of a lenticular lens 124 may overlap with the corresponding reflection pattern 122. Preferably, the valley of each lenticular lens 124 is centrally arranged on the associated reflection pattern 122. Each lenticular lens 124 has a cross-section having a curved shape such as a semicircle, oval, cardioid, or cycloid.

Hereinafter, a method for fabricating the prism sheet according to the first embodiment of the present invention will be described in conjunction with processing steps thereof with reference to FIGS. 7A to 7C.

Figure 7A:
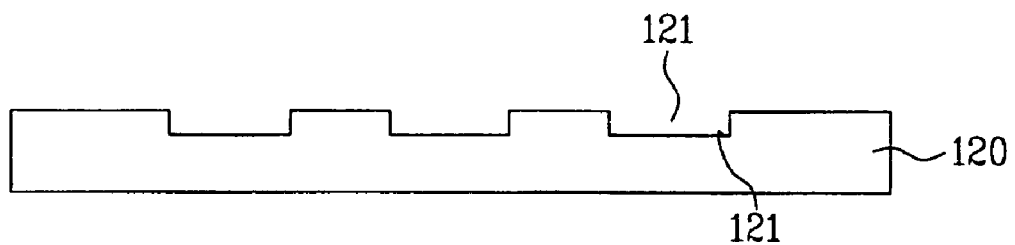
FIGS. 7A to 7C are sectional views illustrating processing steps of a method for fabricating the prism sheet according to the first embodiment of the present invention.

First, the plurality of grooves 121 are formed in the upper surface of a transparent substrate 120, to extend in a parallel direction to each other and to be uniformly spaced apart from one another by a predetermined distance as shown in FIG. 7A.

Figure 7B:
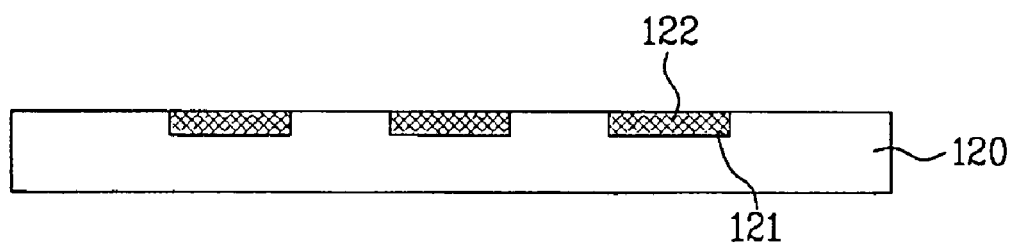

Thereafter, the plurality of reflection patterns 122 are formed in the corresponding plurality of grooves 121 arranged on the transparent substrate 120, respectively, as shown in FIG. 7B.

Figure 7C:
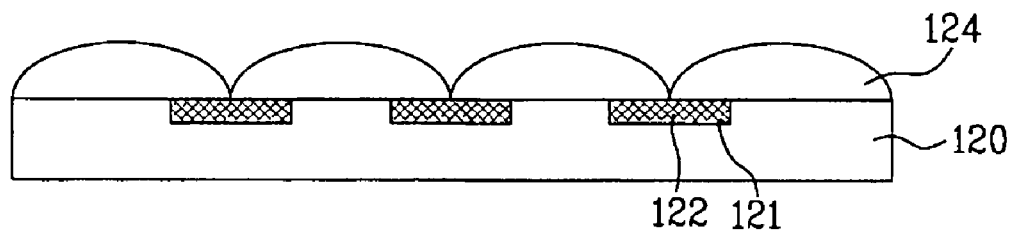

Finally, the plurality of lenticular lenses 124 are formed on the upper surface of the transparent substrate 120 such that the lenticular lenses 124 have valleys arranged on the reflection patterns 122, respectively, as shown in FIG. 7C. As shown, the edge portions of the lenticular lenses 124 may overlap with the corresponding reflection patterns 122.

The prism sheet according to the first embodiment of the present invention fabricated in the above-described manner can enhance the light efficiency and enhance the viewing angle characteristics using the reflection patterns 122 formed in the grooves 121 arranged on the transparent substrate 120 and the lenticular lenses 124 formed on the upper surface of the transparent substrate 120 at the regions where the reflection patterns 122 are arranged.

Also, the prism sheet according to the first embodiment of the present invention can prevent or minimize the reflection patterns 122 from being deformed or peeled off due to heat or external pressure because the reflection patterns 122 are formed in the grooves 121 arranged on the transparent substrate 120 such that the reflection patterns 122 are enclosed by the transparent substrate 120 and the lenticular lenses 124.

It should be noted that while the grooves or indentations 121 are illustrated to be a plurality of parallel-striped grooves, this is not strictly necessary. In other words, other arrangements are possible. It is preferred that the indentations 122 and the lenticular lenses 124 be disposed so that edge portions of the lenticular lenses 124 overlap with the reflection patterns 122 so that the light of the side lobe is prevented from escaping and reflected to be recycled as useful light as much as possible. For condensing efficiency, center portions of the lenticular lens 124 is preferred not to overlap with the reflection patterns 122.

Also, in this embodiment, the upper surfaces of the reflections patterns 122 are illustrated to be planar with the upper surface of a non-grooved area of the transparent substrate 122. However, this is also not strictly necessary.

Figure 8:
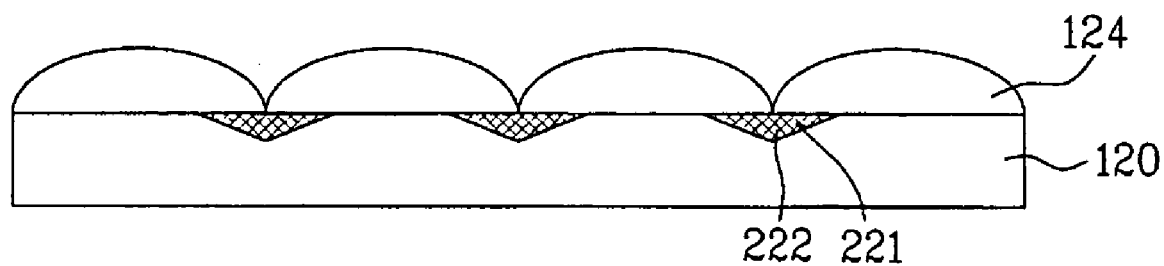
FIG. 8 is a sectional view illustrating a prism sheet according to a second embodiment of the present invention.

FIG. 8 is a sectional view illustrating a prism sheet according to a second embodiment of the present invention.

The prism sheet according to the second embodiment of the present invention is similar to the first embodiment shown in FIG. 6, except for the triangular grooves 221 and reflection patterns 222 in place of the rectangular grooves 121 and the reflection patterns 122, respectively.

The triangular grooves 221, which have a triangular cross-section, are arranged to be in the form of uniformly-spaced parallel stripes in the upper surface of the transparent substrate 120.

Each reflection pattern 222 is formed in an associated one of the triangular grooves 221 to shield light incident to the transparent substrate 120 from a lower surface of the transparent substrate 120 in a state of being inclined at a certain angle or to reflect the incident light to the lower surface of the transparent substrate 120. The reflection patterns 222 are made of titanium oxide ($TiO_2$) or magnesium oxide (MgO).

The reflection patterns 222 reflect the light that would otherwise advance to side lobe regions after being incident to the transparent substrate 120 from the lower surface of the transparent substrate 120, toward the lower surface of the transparent substrate 120, thereby preventing or minimizing the loss of light.

Thus, the prism sheet according to the second embodiment of the present invention has the same or similar beneficial effects as those of the first embodiment.

Figure 9:
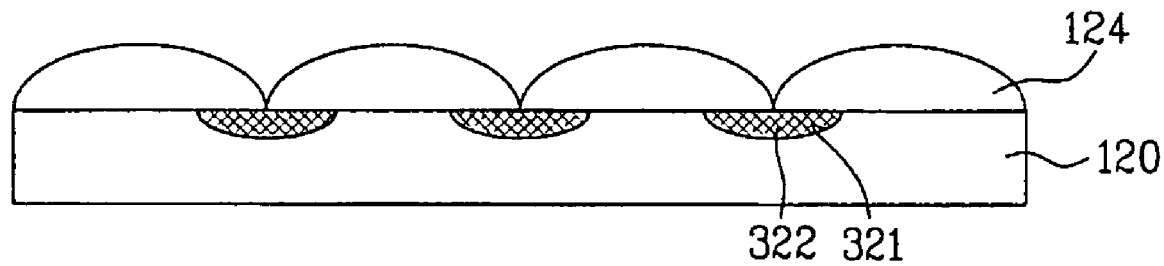
FIG. 9 is a sectional view illustrating a prism sheet according to a third embodiment of the present invention.

FIG. 9 is a sectional view illustrating a prism sheet according to a third embodiment of the present invention.

The prism sheet according to the third embodiment of the present invention is similar to the first embodiment shown in FIG. 6, except for the curved grooves 321 and reflection patterns 322 in place of the rectangular grooves 121 and the reflection patterns 122.

The curved grooves 321 are formed in the form of uniformly-spaced parallel stripes in the upper surface of the transparent substrate 120. Each curved groove 321 has a cross-section having a curved shape such as a semicircle, oval, cardioid, or cycloid.

Each reflection pattern 322 is formed in an associated one of the curved grooves 321 to shield light incident to the transparent substrate 120 from a lower surface of the transparent substrate 120 in a state of being inclined at a certain angle or to reflect the incident light to the lower surface of the transparent substrate 120. The reflection patterns 322 are made of titanium oxide ($TiO_2$) or magnesium oxide (MgO).

The reflection patterns 322 reflect the light that would otherwise advance to side lobe regions after being incident to the transparent substrate 120 from the lower surface of the transparent substrate 120, toward the lower surface of the transparent substrate 120, thereby preventing or minimizing the loss of light.

Thus, the prism sheet according to the third embodiment of the present invention has the same or similar effects as those of the first embodiment.

While not shown, it should be noted that the prism sheet can have grooves, and correspondingly reflection patterns, of multiple shapes. As an example, a single prism sheet may have any combination of square grooves, triangle grooves, curved grooves, etc.

Figure 10:
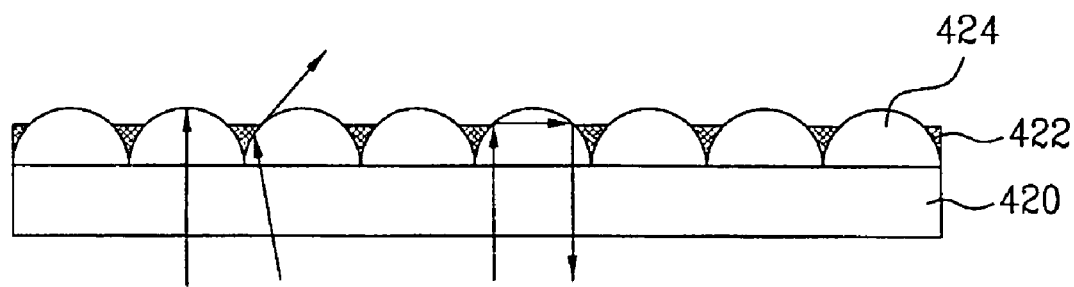
FIG. 10 is a sectional view illustrating a prism sheet according to a fourth embodiment of the present invention.

FIG. 10 is a sectional view illustrating a prism sheet according to a fourth embodiment of the present invention.

Referring to FIG. 10, the prism sheet according to the fourth embodiment of the present invention includes a transparent substrate 420, a plurality of lenticular lenses 424 formed on an upper surface of the transparent substrate 420, and a plurality of reflection patterns 422 formed in respective valleys of the lenticular lenses 424.

The lenticular lenses 424 can be in the form of parallel stripes on the upper surface of the transparent substrate 420, using a material such as polyester (PET). Each lenticular lens 424 has a cross-section having a curved shape such as a semicircle, oval, cardioid, or cycloid.

The lenticular lenses 424 condenses light incident to the transparent substrate 420 from a lower surface of the transparent substrate 420, and externally emits the condensed light.

Each reflection pattern 422 is formed in the valley of the associated lenticular lens 424 such that the reflection pattern 422 has a height lower than that of the associated lenticular lens 424. Thus, as shown, edge portions of the lenticular lenses 424 are overlapped by the corresponding reflection patterns 422 and the center portions of the lenticular lenses are not overlapped. The reflection patterns 422 are made of titanium oxide ($TiO_2$) or magnesium oxide (MgO).

Each reflection pattern 422 reflects light incident to the transparent substrate 420 from the lower surface of the transparent substrate 420 at a certain angle so that the incident light is condensed by the associated lenticular lenses 424. Each reflection pattern 422 also reflects the incident light to adjacent reflection patterns 422 so that the incident light is reflected toward the lower surface of the transparent substrate 420, to be recycled. That is, the reflection patterns 422 reflect the light that would otherwise advance to the side lobe regions after being incident to the transparent substrate 420 from the lower surface of the transparent substrate 420, toward the lower surface of the transparent substrate 420, thereby preventing or minimizing the loss of light.

Hereinafter, a method for fabricating the prism sheet according to the fourth embodiment of the present invention will be described in conjunction with processing steps thereof with reference to FIGS. 11A and 11B.

Figure 11A:
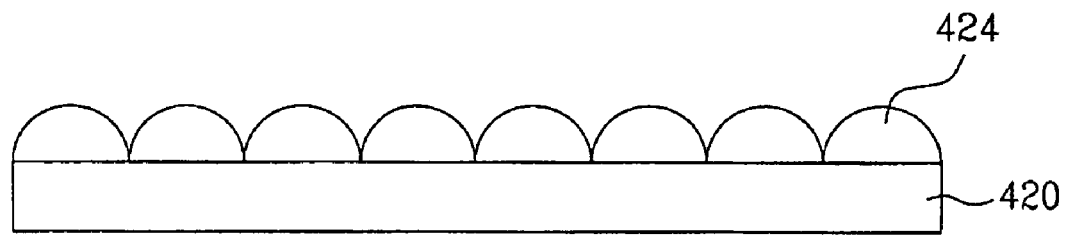
FIGS. 11A and 11B are sectional views illustrating processing steps of a method for fabricating the prism sheet according to the fourth embodiment of the present invention.
Figure 11B:
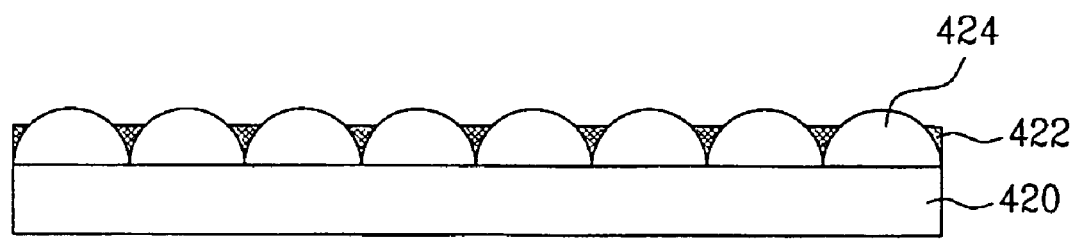

First, the plurality of lenticular lenses 424 are formed on an upper surface of a transparent substrate 420 as illustrated in FIG. 11A. Thereafter, the plurality of reflection patterns 422 are formed in respective valleys of the lenticular lenses 424 as illustrated in FIG. 11B.

The prism sheet according to the fourth embodiment of the present invention fabricated in the above-described manner can prevent or minimize the reflection patterns 422 from being scratched because the reflection patterns 422 are formed in respective valleys of the lenticular lenses 424 arranged on the transparent substrate 420, and thus, can prevent or minimize a degradation in condensing efficiency caused by scratches. It is also possible to simplify the process of fabricating the prism sheet.

Thus, the prism sheet according to the fourth embodiment of the present invention can enhance the efficiency of condensing light incident to the transparent substrate 120 from the lower surface of the transparent substrate 120 and can enhance the viewing angle characteristics.

Figure 12:
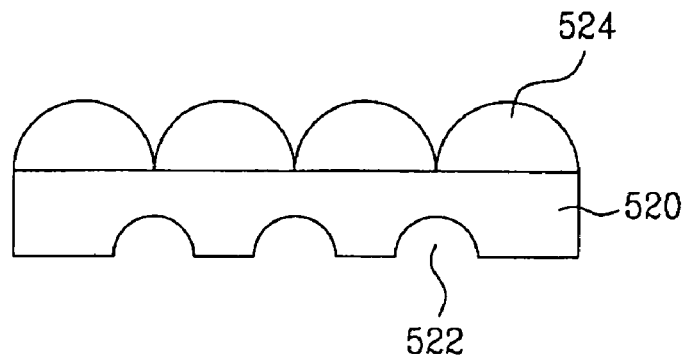
FIG. 12 is a sectional view illustrating a prism sheet according to a fifth embodiment of the present invention.

FIG. 12 is a sectional view illustrating a prism sheet according to a fifth embodiment of the present invention.

Referring to FIG. 12, the prism sheet according to the fifth embodiment of the present invention includes a transparent substrate 520, a plurality of lenticular lenses 524 formed on an upper surface of the transparent substrate 520, and a structure formed in a lower surface of the transparent substrate 520. In this instance, the structure is in the form of plurality of curved grooves 522.

The lenticular lenses 524 may be formed as parallel stripes on the upper surface of the transparent substrate 520, using a material such as polyester (PET). Again, other arrangements of the lenticular lenses 524 are possible. Each lenticular lens 524 has a cross-section having a curved shape such as a semicircle, oval, cardioid, or cycloid.

The lenticular lenses 524 condense light incident to the transparent substrate 520 from the lower surface of the transparent substrate 520, and externally emit the condensed light.

The curved grooves 522 are formed in parallel in the lower surface of the transparent substrate 520 while being spaced apart from one another by a predetermined distance. Again, this is not the only possible arrangement. The curved grooves 522 are arranged to face respective valleys of the lenticular lens 524 formed on the upper surface of the transparent substrate 520. In other words, the edge portions of the lenticular lenses 524 overlap with the curved grooves 522 and the center portions of the lenticular lenses 524 are preferred not to overlap with the curved grooves 522.

The curved grooves 522 refract light incident to the transparent substrate 520 from the lower surface of the transparent substrate 520 so that the light becomes incident to the lenticular lenses 524, so as to be condensed by the lenticular lenses 524.

The prism sheet according to the fifth embodiment of the present invention can enhance the efficiency of condensing light incident to the transparent substrate 520 from the lower surface of the transparent substrate 520 and enhance the viewing angle characteristics using the lenticular lenses 524 formed on the transparent substrate 520 and the curved grooves 522 formed in the lower surface of the transparent substrate 520 at regions corresponding to the valleys of the lenticular lenses 524. That is, in the prism sheet according to the fifth embodiment of the present invention, the light that would otherwise advance toward side lobe regions after being incident to the transparent substrate 520 from the lower surface of the transparent substrate 520 is refracted toward the lenticular lenses 524 by the curved grooves 522. Accordingly, it is possible to eliminate or to significantly reduce the leakage of light caused by side lobes, and thus, enhance the condensing efficiency and the viewing angle characteristics.

Figure 13:
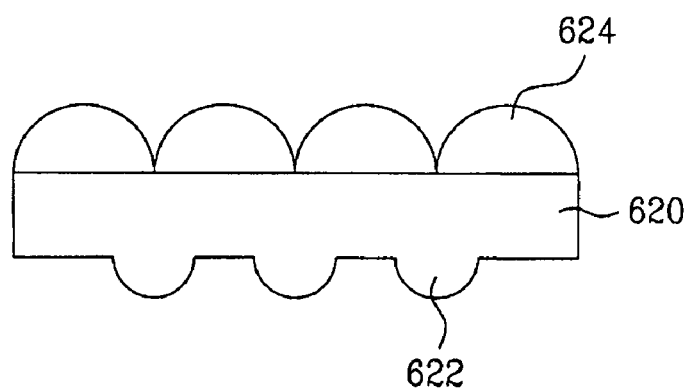
FIG. 13 is a sectional view illustrating a prism sheet according to a sixth embodiment of the present invention.

FIG. 13 is a sectional view illustrating a prism sheet according to a sixth embodiment of the present invention.

Referring to FIG. 13, the prism sheet according to the sixth embodiment of the present invention includes a transparent substrate 620, a plurality of lenticular lenses 624 formed on an upper surface of the transparent substrate 620, and a plurality of curved protrusions 622 formed on a lower surface of the transparent substrate 620. Each curved protrusion 622 has a curved cross-section.

The lenticular lenses 624 can be formed in the form of parallel stripes on the upper surface of the transparent substrate 620, using a material such as polyester (PET). Other arrangements are possible. Each lenticular lens 624 has a cross-section having a curved shape such as a semicircle, oval, cardioid, or cycloid. The lenticular lenses 624 condenses light incident to the transparent substrate 620 from the lower surface of the transparent substrate 620, and externally emits the condensed light.

The curved protrusions 622 are formed corresponding to the arrangement of the lenticular lenses 624. For example, the curved protrusions 622 may be formed in parallel on the lower surface of the transparent substrate 620 and spaced apart from one another by a predetermined distance based on a similar arrangement of the lenticular lenses 624 on the upper surface of the substrate 620. The curved protrusions 622 are arranged to face respective valleys of the lenticular lens 624 formed on the upper surface of the transparent substrate 620. In other words, the edge portions of the lenticular lenses 624 overlap with the curved protrusions 622 and the center portions of the lenticular lenses 624 are preferred not to overlap with the curved protrusions 622. Each curved protrusion 622 has a cross-section having a curved shape such as a semicircle, oval, cardioid, or cycloid.

The curved protrusions 622 refract light incident to the transparent substrate 620 from the lower surface of the transparent substrate 620 so that the light becomes incident to the lenticular lenses 624, so as to be condensed by the lenticular lenses 624.

The prism sheet according to the sixth embodiment of the present invention can enhance the efficiency of condensing light incident to the transparent substrate 620 from the lower surface of the transparent substrate 620 and enhance the viewing angle characteristics using the lenticular lenses 624 formed on the transparent substrate 620 and the curved protrusions 622 formed in the lower surface of the transparent substrate 620 at regions corresponding to the valleys of the lenticular lenses 624. That is, in the prism sheet according to the sixth embodiment of the present invention, light that would otherwise advance toward side lobe regions after being incident to the transparent substrate 620 from the lower surface of the transparent substrate 620 is refracted toward the lenticular lenses 624 by the curved protrusions 622. Accordingly, it is possible to eliminate or to significantly reduce the leakage of light caused by side lobes, and thus, enhance the condensing efficiency and the viewing angle characteristics.

Figure 14:
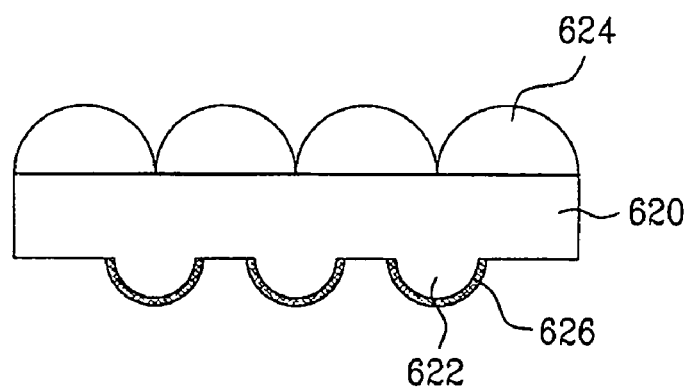
FIG. 14 is a sectional view illustrating reflection layers respectively formed on curved protrusions shown in FIG. 13.

The prism sheet according to the sixth embodiment of the present invention further includes reflection layers 626 respectively formed on the surfaces of the curved protrusions 622, as shown in FIG. 14.

Each reflection layer 622, which is formed on the surface of an associated one of the curved protrusions 622, shields and reflects light incident to the transparent substrate 620 from the lower surface of the transparent substrate 620, so as to recycle the incident light. The reflection layers 622 also function to re-reflect light incident to the transparent substrate 620 after being reflected by the lenticular lenses 624. The reflection layers 622 are made of titanium oxide ($TiO_2$) or magnesium oxide (MgO).

By virtue of the reflection layers 626 formed on the surfaces of the curved protrusions 622, the prism sheet according to the sixth embodiment of the present invention can further enhance the light condensing efficiency and viewing angle characteristics.

Figure 15:
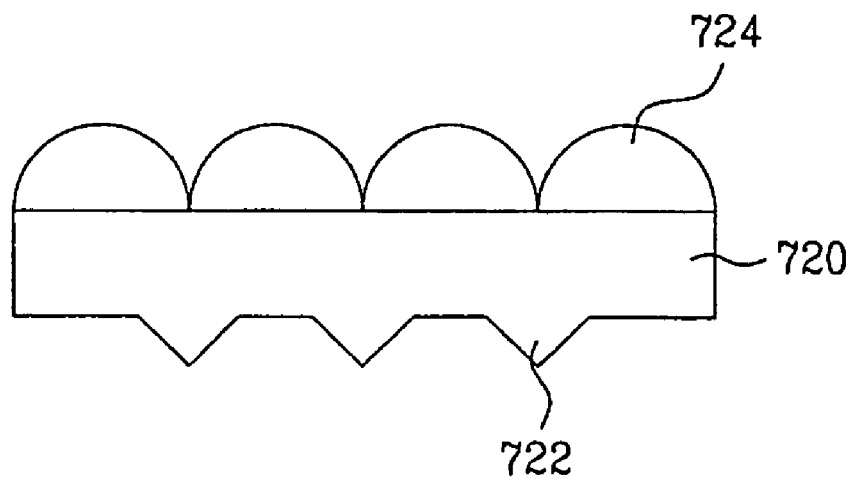
FIG. 15 is a sectional view illustrating a prism sheet according to a seventh embodiment of the present invention.

FIG. 15 is a sectional view illustrating a prism sheet according to a seventh embodiment of the present invention.

Referring to FIG. 15, the prism sheet according to the seventh embodiment of the present invention includes a transparent substrate 720, a plurality of lenticular lenses 724 formed on an upper surface of the transparent substrate 720, and a plurality of triangular protrusions 722 formed in a lower surface of the transparent substrate 720. Each triangular protrusion 722 has a triangular cross-section.

The lenticular lenses 724 can be formed to be in many arrangements including as parallel stripes on the upper surface of the transparent substrate 720, using a material such as polyester (PET). Each lenticular lens 724 has a cross-section having a curved shape such as a semicircle, oval, cardioid, or cycloid.

The lenticular lenses 724 condenses light incident to the transparent substrate 720 from the lower surface of the transparent substrate 720, and externally emits the condensed light.

The triangular protrusions 722 are formed in the lower surface of the transparent substrate 720 in an arrangement corresponding to the arrangement to the lenticular lenses 722 such as being parallel and spaced apart from one another by a predetermined distance. The triangular protrusions 722 face respective valleys of the lenticular lens 724 formed on the upper surface of the transparent substrate 720.

The triangular protrusions 722 refract light incident to the transparent substrate 720 from the lower surface of the transparent substrate 720 so that the light becomes incident to the lenticular lenses 724, so as to be condensed by the lenticular lenses 724.

The prism sheet according to the seventh embodiment of the present invention can enhance the efficiency of condensing light incident to the transparent substrate 720 from the lower surface of the transparent substrate 720 and enhance the viewing angle characteristics using the lenticular lenses 724 formed on the transparent substrate 720 and the triangular protrusions 722 formed in the lower surface of the transparent substrate 720 at regions corresponding to the valleys of the lenticular lenses 724. That is, in the prism sheet according to the seventh embodiment of the present invention, light that would otherwise advance toward side lobe regions after being incident to the transparent substrate 720 from the lower surface of the transparent substrate 720 is refracted toward the lenticular lenses 724 by the triangular protrusions 722. Accordingly, it is possible to eliminate or to significantly reduce the leakage of light caused by side lobes, and thus, enhance the condensing efficiency and the viewing angle characteristics.

Figure 16:
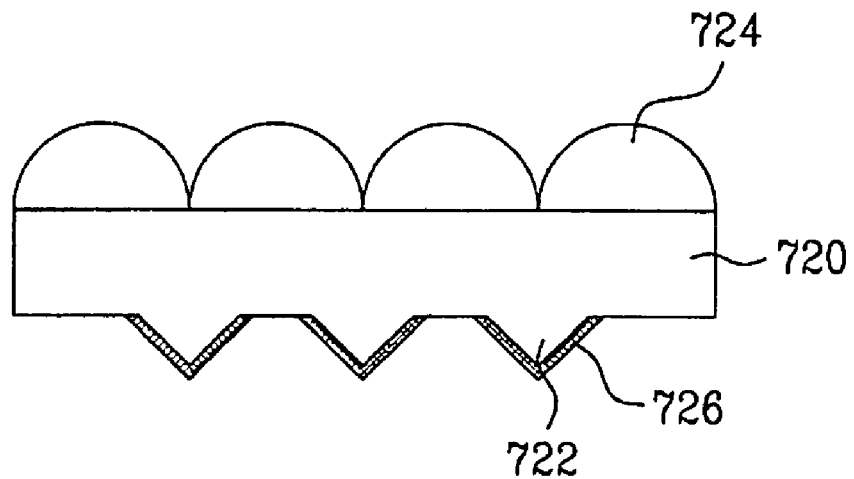
FIG. 16 is a sectional view illustrating reflection layers respectively formed on triangular protrusions shown in FIG. 15.

The prism sheet according to the seventh embodiment of the present invention further includes reflection layers 726 respectively formed on the surfaces of the triangular protrusions 722, as shown in FIG. 16.

Each reflection layer 722, which is formed on the surface of an associated one of the triangular protrusions 722, shields and reflects light incident to the transparent substrate 720 from the lower surface of the transparent substrate 720, so as to recycle the incident light. The reflection layers 722 also function to re-reflect light incident to the transparent substrate 720 after being reflected by the lenticular lenses 724. The reflection layers 722 are made of titanium oxide ($TiO_2$) or magnesium oxide (MgO).

By virtue of the reflection layers 726 formed on the surfaces of the triangular protrusions 722, the prism sheet according to the seventh embodiment of the present invention can further enhance the light condensing efficiency and viewing angle characteristics.

Figure 17:
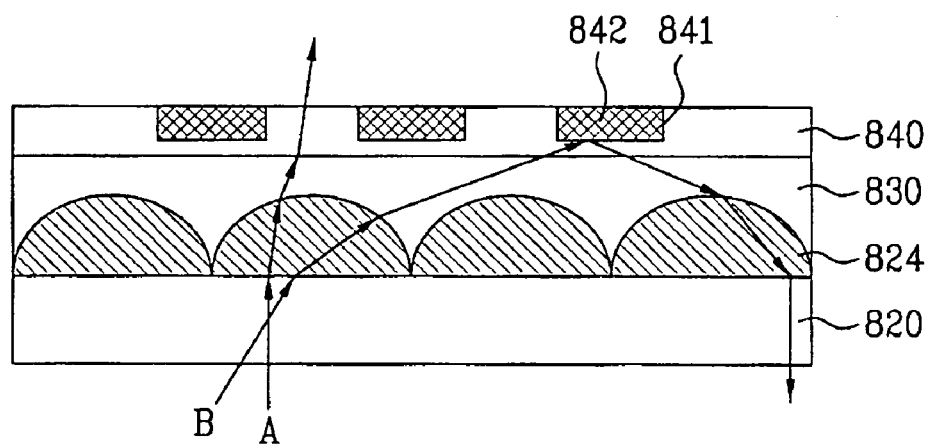
FIG. 17 is a sectional view illustrating a prism sheet according to an eighth embodiment of the present invention.

FIG. 17 is a sectional view illustrating a prism sheet according to an eighth embodiment of the present invention.

Referring to FIG. 17, the prism sheet according to the eighth embodiment of the present invention includes a transparent substrate 820 which has a first refractive index, a plurality of lenticular lenses 824 which are formed on an upper surface of the transparent substrate 820 and have a second refractive index, a first protective layer 830 formed on the transparent substrate 820 to cover the lenticular lenses 824 and has a third refractive index, a second protective layer 840 which is formed over the first protective layer 830, a plurality of grooves 841 formed in the second protective layer 840 and has a fourth refractive index, and a plurality of reflection patterns 842 respectively formed in the grooves 841.

The transparent substrate 820 is fabricated to have a flat panel structure having the first refractive index. The transparent substrate 820 refracts light incident thereto from a lower surface thereof due to the first refractive index.

The lenticular lenses 824 are can be formed in one multiple arrangements including in the form of parallel stripes on the upper surface of the transparent substrate 820, using a material such as polyester (PET) having the second refractive index. Each lenticular lens 824 has a cross-section having a curved shape such as a semicircle, oval, cardioid, or cycloid. The lenticular lenses 824 condense light incident thereto after passing through the transparent substrate 820 and emit the condensed light.

The first protective layer 830 is formed over the entire upper surface of the transparent substrate 820 to cover the lenticular lenses 824. The first protective layer 830 refracts light emerging from each lenticular lens 824 due to a difference between the third refractive index and the second refractive index of the lenticular lens 824 so that the refracted light is incident to the second protective layer 840. The first protective layer 830 also functions to protect the lenticular lenses 824 from heat and external pressure. The third refractive index of the first protective layer 830 is set in accordance with the advance angle of light incident to the first protective layer 830 and the advance angle of light emitted from the first protective layer 830.

The second protective layer 840 is formed over the entire upper surface of the first protective layer 830. The second protective layer 840 refracts light emitted from the first protective layer 830 at the due to a difference between the fourth refractive index and the third refractive index of the first protective layer 830, and externally emits the refracted light.

The grooves/indentations 841 can be formed in many arrangements including in the form of uniformly-spaced parallel stripes in the upper surface of the second protective layer 840 while facing respective valleys of the lenticular lenses 824. Each groove 841 has a rectangular cross-section.

Each reflection pattern 842 is formed in association with one of the grooves 841 to reflect light that is incident to the second protective layer 840 in a state of being inclined at a certain angle, toward the lower surface of the transparent substrate 820. The reflection patterns 842 are made of titanium oxide ($TiO_2$) or magnesium oxide (MgO). The positions of the reflection patterns 842 may be varied in accordance with the refractive index of the lenticular lenses 824 and the advance angle of light incident to the second protective layer 840.

The reflection patterns 842 reflect light that would otherwise advance to the side lobe regions after being incident to the second protective layer 840, toward the lower surface of the transparent substrate 820, thereby preventing or minimizing the loss of light.

The prism sheet according to the eighth embodiment of the present invention can more securely protect the lenticular lenses 824, and can prevent or minimize the lenticular lenses 824 from being damaged due to external pressure. The prism sheet according to the eighth embodiment of the present invention can also prevent or minimize the reflection patterns 842 from being deformed or peeled off due to heat or external pressure because the reflection patterns 842 are formed in the grooves 841 arranged on the second protective layer 840.

Figure 18:
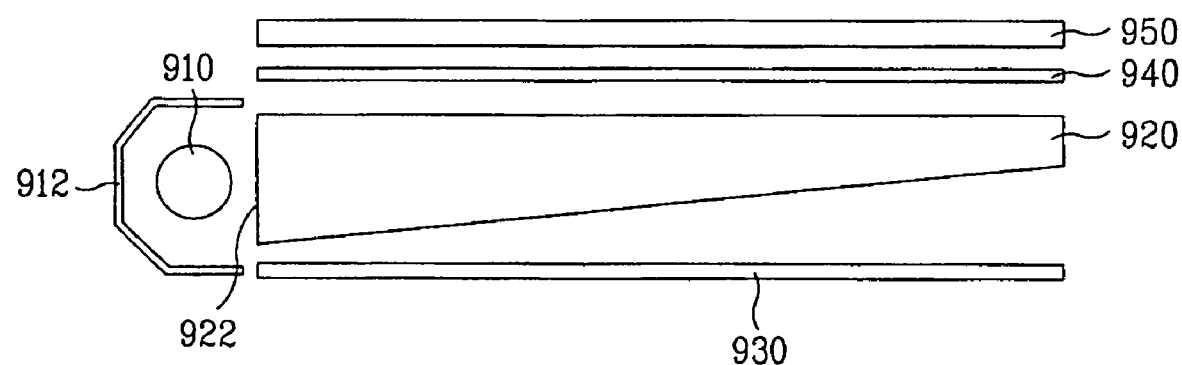
FIG. 18 is a sectional view schematically illustrating a first embodiment of a backlight unit according to the present invention.
Figure 19:
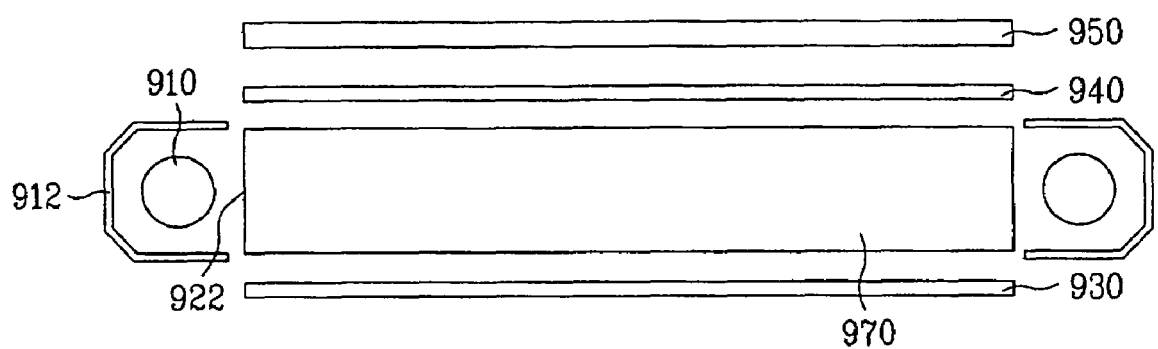
FIG. 19 is a sectional view schematically illustrating a second embodiment of a backlight unit according to the present invention.
Figure 20:
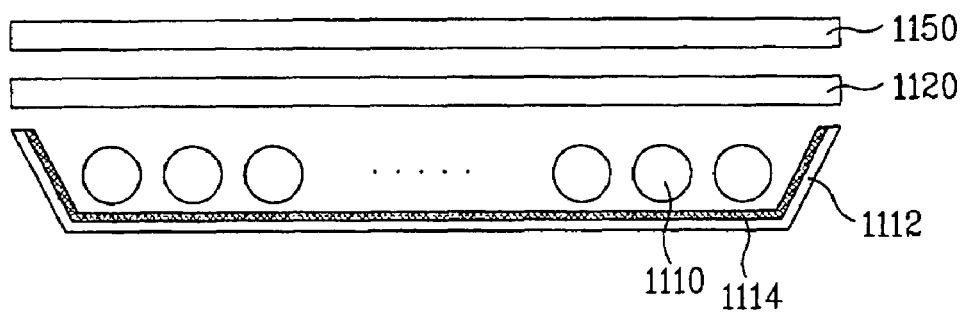
FIG. 20 is a sectional view schematically illustrating a third embodiment of a backlight unit according to the present invention.

The above-described prism sheets according to any one of the first through eighth embodiments of the present invention can be used in a backlight unit as shown in FIGS. 18 to 20.

FIG. 18 is a sectional view schematically illustrating a first embodiment of a backlight unit according to the present invention.

Referring to FIG. 18, the first backlight unit embodiment includes a lamp 910 which emits light, a light guide plate 920 which guides the light incident thereto from the lamp 910, and a lamp housing 912 which encloses an incidence face 922 of the light guide plate 920 and the lamp 910. The backlight unit also includes a reflection plate 930 which is arranged beneath the light guide plate 920, a diffusion sheet 940 which is arranged on the light guide plate 920 to diffuse light emerging from the light guide plate 920, and a prism sheet 950 which condenses light emerging from the diffusion sheet 940.

For the lamp 910, a cold cathode fluorescent lamp is mainly used. The lamp 910 is turned on by a lamp drive voltage supplied from an inverter (not shown), to irradiate light to be incident to the incidence face 922 of the light guide plate 920 formed at one side of the light guide plate 920.

The lamp housing 912 is arranged at the one side of the light guide plate 920 to enclose the lamp 910 and the incidence face 922 of the light guide plate 920. The lamp housing 912 is provided, at an inner surface thereof, with a reflection face to reflect the light from the lamp 910 toward the incidence face 922 of the light guide plate 920.

The light guide plate 920 enables the incident light from the lamp 910 to reach a position spaced apart from the lamp 910 by a great distance, and guides the incident light toward the diffusion sheet 940, i.e. perpendicular to the direction of the light incident to the incidence face 922. A printed pattern is provided at an inclined lower surface of the light guide plate 920 to form a reflection face, so that the incident light is reflected from the inclined lower surface of the light guide plate 920 at a certain angle such that the light travels uniformly toward the diffusion sheet 940.

The reflection plate 930 is arranged beneath the light guide plate 920 to re-reflect light incident thereto from the reflection face of the light guide plate 920 toward the light guide plate 920, and thus, to reduce loss of light.

The diffusion sheet 940 diffuses the light emitted from the light guide plate 920 over the entire region of the prism sheet 950.

The prism sheet 950 has a structure identical to that of any one of the prism sheets according to the first through eighth embodiments of the present invention shown in FIGS. 5 to 17. Accordingly, details of the prism sheet 950 will be appreciated by referring to the descriptions of the prism sheets according to the first through eighth embodiments of the present invention.

The above-described backlight unit according to the first embodiment of the present invention can remove and/or recycle light traveling toward the side lobe regions of the prism sheet 950, namely, light causing leakage thereof, thereby preventing or minimizing a light leakage phenomenon, and enhancing the light condensing efficiency and brightness symmetry. Accordingly, viewing angle characteristics is enhanced.

FIG. 19 is a sectional view schematically illustrating a second embodiment of a backlight unit according to the present invention.

Referring to FIG. 19, the second backlight unit embodiment includes a light guide plate 970 having a flat plate structure, lamps 910 which face incidence face 922 formed at opposite sides of the light guide plate 970, respectively, and a pair of lamp housings 912 which enclose respective incidence faces 922 of the light guide plate 970 and respective lamps 910. The backlight unit also includes a reflection plate 930 which is arranged beneath the light guide plate 970, a diffusion sheet 940 which is arranged on the light guide plate 970 to diffuse light emerging from the light guide plate 970, and a prism sheet 950 which condenses light emerging from the diffusion sheet 940.

The above-described second backlight unit embodiment is similar to the first backlight unit embodiment, except for the light guide plate 970 and the lamps 910 being arranged to face the opposite sides of the light guide plate 970.

The backlight unit according to the second embodiment of the present invention can greatly enhance the brightness of externally-emitted light because light is incident to the light guide plate 970 at opposite sides thereof using the lamps 910.

The backlight unit according to the second embodiment of the present invention can also remove light traveling toward the side lobe regions of the prism sheet 950, namely, light causing leakage thereof, thereby preventing or minimizing the light leakage phenomenon, and enhancing the light condensing efficiency and brightness symmetry. Accordingly, the viewing angle characteristics are enhanced.

FIG. 20 is a sectional view schematically illustrating a third backlight unit embodiment according to the present invention.

Referring to FIG. 20, the third backlight unit embodiment includes a plurality of lamps 1110 which emit light, a bottom cover 1112 which receives the lamps 1110, a diffusion plate 1120 which covers an upper surface of the bottom cover 1112 and diffuses light incident from the lamps 1110 over the entire region of the diffusion plate 1120, and a prism sheet 1150 arranged over the diffusion plate 1120 to condense light emerging from the diffusion plate 1120.

For each lamp 1110, a cold cathode fluorescent lamp is mainly used. The lamps 1110 are turned on by a lamp drive voltage supplied from an inverter (not shown), to irradiate light to a lower surface of the diffusion plate 1120.

The bottom cover 1112 receives and supports the lamps 1110. A reflection sheet 1114 is attached to an inner surface of the bottom cover 1112 to reflect light incident from the lamps 1110 toward the diffusion plate 1120.

The diffusion plate 1120 is arranged to cover the upper surface of the bottom cover 1112. The diffusion plate 1120 diffuses light incident from the lamps 1110 and the reflection sheet 1114 of the bottom cover 1112 over the entire region of the diffusion plate 1120 and irradiates the diffused light to the prism sheet 1150.

The prism sheet 1150 has a structure identical to that of any one of the prism sheets according to the first through eighth embodiments of the present invention shown in FIGS. 5 to 17. Accordingly, details of the prism sheet 1150 will be appreciated by referring to the descriptions of the prism sheets according to the first through eighth embodiments of the present invention.

The above-described backlight unit according to the third embodiment of the present invention can greatly enhance the brightness of externally-emitted light because the light from the lamps 1110 is directly irradiated to the lower surface of the diffusion plate 1120.

The above-described backlight unit according to the third embodiment of the present invention can remove or recycle light traveling toward the side lobe regions of the prism sheet 1150, namely, light causing leakage thereof, thereby preventing or minimizing the light leakage phenomenon, and achieving an enhancement in light condensing efficiency and an enhancement in brightness symmetry. Accordingly, an enhancement in viewing angle characteristics is achieved.

Meanwhile, the backlight unit according to any one of the first through third embodiment of the present invention can be used as a light source for an LCD device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, in a prism sheet according to any embodiment of the present invention and the backlight unit using the same, reflection patterns are formed in a plurality of grooves formed in an upper surface of a transparent substrate to have a rectangular, triangular or curved cross-section, respectively, and a plurality of lenticular lenses are formed on the transparent substrate formed with the reflection patterns. According, it is possible to enhance the light condensing efficiency and to enhance the viewing angle characteristics. The reflection patterns are also prevented from being deformed or peeled off due to heat or external pressure.

In a prism sheet according to another embodiment of the present invention and a backlight unit using the same, reflection patterns are formed in respective valleys of lenticular lenses, respectively. Accordingly, it is possible to enhance the light condensing efficiency and to enhance the viewing angle characteristics. It is also possible to prevent or minimize the reflection patterns from being scratched, and thus, to prevent or minimize a degradation in condensing efficiency caused by scratches. The process of fabricating the prism sheet is also simplified.

In a prism sheet according to another embodiment of the present invention and a backlight unit using the same, curved grooves, curved protrusions or triangular protrusions are formed at a lower surface of a transparent substrate to face respective valleys of lenticular lenses. Accordingly, it is possible to prevent or minimize the leakage of light caused by side lobes, and thus, to enhance the light condensing efficiency and to enhance the viewing angle characteristics.

In a prism sheet according to another embodiment of the present invention and a backlight unit using the same, a protection layer is formed over a plurality of lenticular lenses. Accordingly, it is possible to more securely protect the lenticular lenses, and to prevent or minimize the lenticular lenses from being damaged due to external pressure. Since reflection patterns may be formed in grooves arranged on the protective layer in accordance with this embodiment, it is also possible to prevent or minimize the reflection patterns from being deformed or peeled off due to heat or external pressure.

What is claimed is:

1. A prism sheet, comprising:
   a transparent substrate;
   a plurality of lenticular lenses formed on an upper surface of the transparent substrate;
   a structure formed on a lower surface of the transparent substrate to face respective valleys disposed between the associated lenticular lenses; and
   reflection layers formed on respective surfaces of the structure to reflect light incident to the lower surface of the transparent substrate though the structure, toward the lower surface of the transparent substrate and re-reflect light incident to the transparent substrate after being reflected by the lenticular lenses,
   wherein the light incident to the reflection layers is not incident on the structure.

2. The prism sheet according to claim 1, wherein the structure comprises one or more curved grooves, one or more curved protrusions, one or more triangular protrusions, or any combination thereof.

3. The prism sheet according to claim 2, wherein the reflection layers formed on respective surfaces of the one or more curved protrusions or the one or more triangular protrusions.

4. The prism sheet according to claim 3, wherein the reflection layers are made of titanium oxide ($TiO_2$) or magnesium oxide (MgO).

5. A prism sheet, comprising:
   a transparent substrate;
   a plurality of lenticular lenses formed on the transparent substrate;
   a first protection layer formed on the transparent substrate to enclose directly entire surface of the plurality of lenticular lenses;
   a second protection layer formed over the first protection layer;
   a plurality of grooves formed in an upper surface of the second protection layer to extend in a parallel direction to each other and to be uniformly spaced apart from one another; and
   a plurality of reflection patterns respectively formed in the plurality of grooves to reflect incident light through the lower surface of the transparent substrate,
   wherein the plurality of reflection patterns face respective valleys of the associated lenticular lens and a portion of an emission surface of respective lenticular lenses.

6. A backlight unit, comprising:
   at least one lamp which emits light;
   a light guide plate which changes a traveling direction of light, incident from the lamp through an incidence face provided at a side of the light guide plate corresponding to the lamp, to a direction perpendicular to an incident direction of the light; and
   a prism sheet which condenses the light emerging from the light guide plate,
   wherein the prism sheet comprises:
   a transparent substrate;
   a plurality of lenticular lenses formed on an upper surface of the transparent substrate;
   a structure formed on a lower surface of the transparent substrate to face respective valleys disposed between the associated lenticular lenses; and
   reflection layers formed on respective surfaces of the structure to reflect light incident to the lower surface of the transparent substrate through the structure, toward the lower surface of the transparent substrate and re-reflect light incident to the transparent substrate after being reflected by the lenticular lenses,
   wherein the light incident to the reflection layers is not incident on the structure.

7. The backlight unit according to claim 6, wherein the structure comprises one or more curved grooves, one or more curved protrusions, one or more triangular protrusions, or any combination thereof.

8. The backlight unit according to claim 6, wherein the at least one lamp comprises a first lamp arranged at one side of the light guide plate and a second lamp arranged at an opposite side of the light guide plate.

9. The backlight unit according to claim 6, further comprising:
   at least one lamp housing corresponding to the at least one lamp arranged to enclose the incidence face of the light guide plate and the lamp;
   a diffusion sheet arranged between the light guide plate and the prism sheet to diffuse the light emerging from the light guide plate; and
   a reflection plate arranged beneath a lower surface of the light guide plate.

10. The backlight unit according to claim 6, wherein the reflection layers formed on respective surfaces of the one or more curved protrusions or the one or more triangular protrusions.

11. A backlight unit, comprising:
   at least one lamp which emits light;
   a light guide plate which changes a traveling direction of light, incident from the lamp through an incidence face provided at a side of the light guide plate corresponding to the lamp, to a direction perpendicular to an incident direction of the light; and
   a prism sheet which condenses the light emerging from the light guide plate,
   wherein the prism sheet comprises:
   a transparent substrate;
   a plurality of lenticular lenses formed on the transparent substrate;
   a first protection layer formed on the transparent substrate to enclose directly entire surface of the plurality of lenticular lenses;
   a second protection layer formed over the first protection layer;

a plurality of grooves formed in an upper surface of the second protection layer to extend in a parallel direction to each other and to be uniformly spaced apart from one another; and a plurality of reflection patterns respectively formed in the plurality of grooves, wherein the plurality of reflection patterns face respective valleys of the associated lenticular lens and a portion of an emission surface of respective lenticular lenses.

12. The backlight unit according to claim 11, wherein the at least one lamp comprises a first lamp arranged at one side of the light guide plate and a second lamp arranged at an opposite side of the light guide plate.

13. The backlight unit according to claim 11, further comprising:

at least one lamp housing corresponding to the at least one lamp arranged to enclose the incidence face of the light guide plate and the lamp;

a diffusion sheet arranged between the light guide plate and the prism sheet to diffuse the light emerging from the light guide plate; and a reflection plate arranged beneath a lower surface of the light guide plate.

14. A backlight unit, comprising:

a plurality of lamps which emit light;

a bottom cover which receives and supports the plurality of lamps;

a diffusion plate which covers an upper surface of the bottom cover and diffuses the light emitted from the plurality of lamps; and a prism sheet which condenses the light emerging from the diffusion plate, wherein the prism sheet comprises:

a transparent substrate;

a plurality of lenticular lenses formed on an upper surface of the transparent substrate;

a structure formed on a lower surface of the transparent substrate to face respective valleys disposed between the associated lenticular lenses; and reflection layers formed on respective surfaces of the structure to reflect light incident to the lower surface of the transparent substrate through the structure, toward the lower surface of the transparent substrate and re-reflect light incident to the transparent substrate after being reflected by the lenticular lenses, wherein the light incident to the reflection layers is not incident on the structure.

15. The backlight unit according to claim 14, wherein the structure comprises one or more curved grooves, one or more curved protrusions, one or more triangular protrusions, or any combination thereof.

16. The backlight unit according to claim 14, wherein the reflection layers formed on respective surfaces of the one or more curved protrusions or the one or more triangular protrusions.

17. A backlight unit, comprising:

a plurality of lamps which emit light;

a bottom cover which receives and supports the plurality of lamps;

a diffusion plate which covers an upper surface of the bottom cover, and diffuses the light emitted from the plurality of lamps; and a prism sheet which condenses light emerging from the diffusion plate, wherein the prism sheet comprises:

a transparent substrate;

a plurality of lenticular lenses formed on the transparent substrate;

a first protection layer formed on the transparent substrate to enclose directly entire surface of the plurality of lenticular lenses;

a second protection layer formed over the first protection layer;

a plurality of grooves formed in an upper surface of the second protection layer to extend in a parallel direction to each other to be uniformly spaced apart from one another; and a plurality of reflection patterns respectively formed in the plurality of grooves to reflect incident light through the lower surface of the transparent substrate, wherein the plurality of reflection patterns face respective valleys of the associated lenticular lens.

18. A prism sheet, comprising:

a transparent substrate;

a plurality of lenticular lenses disposed on the transparent substrate;

a first protection layer disposed on the transparent substrate to enclose directly entire surface of the plurality of lenticular lenses;

a second protection layer disposed over the first protection layer, the second protection layer including a plurality of indentations formed on an upper surface of the second protection layer; and a plurality of reflection patterns respectively formed in the plurality of indentations, wherein an edge portion of at least one lenticular lens is overlapped by at least one reflection pattern.

19. The prism sheet of claim 18, wherein the plurality of indentations are a plurality of parallel striped grooves.

20. The prism sheet of claim 19, wherein the plurality of parallel striped grooves are substantially uniformly spaced apart.

21. The prism sheet of claim 18, wherein a center portion of at least one lenticular lens is not overlapped by any of the plurality of reflection patterns.

22. The prism sheet of claim 18, wherein the transparent substrate has a first refractive index, the plurality of lenticular lenses have a second refractive index different from the first refractive index, the first protective layer has a third refractive index different from the second refractive index, and the second protective layer has a fourth refractive index different from the third refractive index.

* * * * *